US008069313B2

(12) United States Patent
Potnis et al.

(10) Patent No.: US 8,069,313 B2
(45) Date of Patent: Nov. 29, 2011

(54) METHOD AND SYSTEM FOR MANAGING CACHE INVALIDATION

(75) Inventors: Rohit Potnis, San Jose, CA (US); Rajesh Arukala, Fremont, CA (US)

(73) Assignee: SAP AG, Walldorf (DE)

( * ) Notice: Subject to any disclaimer, the term of this patent is extended or adjusted under 35 U.S.C. 154(b) by 307 days.

(21) Appl. No.: 12/413,208

(22) Filed: Mar. 27, 2009

(65) Prior Publication Data

US 2010/0250860 A1    Sep. 30, 2010

(51) Int. Cl.
*G06F 12/00* (2006.01)
*G06F 12/08* (2006.01)
(52) U.S. Cl. .......... 711/141; 711/E12.001; 711/E12.023
(58) Field of Classification Search ................. 711/141, 711/E12.001, E12.023
See application file for complete search history.

(56) References Cited

U.S. PATENT DOCUMENTS

| 6,981,105 | B2 | 12/2005 | Bourne et al. |
| 7,308,541 | B1 | 12/2007 | Kisclev et al. |
| 2002/0133537 | A1 | 9/2002 | Lau et al. |
| 2007/0055647 | A1* | 3/2007 | Mullins et al. ............... 707/2 |
| 2008/0098041 | A1 | 4/2008 | Chidambaran et al. |

OTHER PUBLICATIONS

Pooja Kohli and Rada Chirkova, "Cache Invalidation and Update Propagation in Distributed Caches," in the Proceedings of an International Advanced Database Conference (IADC), San Diego, CA, Jun. 2005.

* cited by examiner

*Primary Examiner* — Yong Choe
(74) *Attorney, Agent, or Firm* — Fountainhead Law Group P.C.

(57) ABSTRACT

In one embodiment the present invention includes a method and system for managing cache invalidation. In one embodiment, connection information to a database in stored in an intermediate cache management module. If changes are made to objects in the database, the objects are invalidated in a local cache. The connection information is accessed and used to connect to the database by an invalidation listener. The invalidation listener may determine the changes so that the changes can be reflected in the cache. Embodiments of the present invention may be implemented across multiple nodes in a clustered environment for updating caches on different nodes in response to changes to data objects performed by other nodes.

20 Claims, 7 Drawing Sheets

METHOD AND SYSTEM FOR MANAGING CACHE INVALIDATION

BACKGROUND

The present invention relates to data caching, and in particular, to a method and system for managing cache invalidation.

Generally, a computer software application may be executed on a single computer system. However, larger or more complex software applications that may require a large amount of processing may run very slowly on a single computer system, or, even worse, may not be able to run at all on a single computer system. Thus, these types of software applications may run in a clustered environment where multiple computer systems share the process demands of the software application. In a clustered environment, multiple computer systems, referred to as nodes, are commonly linked together via a local area network, and share in the processing demands of the software application.

Caching is a well-known technique for quick access to data. One method of caching data is to replicate the data and store it in another location where it would be quicker to access the data in the other location than it would be to access the data in the original location. One criteria that may be used to determine whether to cache particular data is if the particular data is frequently accessed. An example where data caching may be used is a software application which accesses data stored in a database. Data that is often accessed by the software application may be cached (e.g., locally on the same node in a cluster). In that case, the cached data may be replicated and stored in another location where access to the data would be faster than accessing the data stored in the database (e.g., the local computer system memory). Since cached data is a duplicate of the original data, the cached data must be updated when the original data is modified or deleted in order to maintain data consistency. Following the above example, when the software application modifies or deletes data in the database and such data is also cached (i.e., the data in the cache has been invalidated), the cached data must be changed to reflect the change the software made to the data in the database.

Caching and clustering may both be used in conjunction to allow processor-intensive software applications to operate quickly and efficiently. That is, clustering may provide the processing power needed to run the software application, and caching may allow the software application to quickly retrieve that data that it needs to perform its tasks. An example where caching and clustering may be utilized is a software application that processes a large amount of requests from users (e.g., clients) where the requests require the software application to access data stored in a database. Accordingly, each node in the cluster will have its own copy of cached data. When a user request changes data in the database and such data is also cached (i.e., the data in the cache has been invalidated), the cached data in each node in the cluster must be changed to reflect the change to the data in the database made by the server software application.

Thus, there is a need for improved synchronization of caches in nodes in a clustered environment. The present invention solves these and other problems by providing a method and system for managing cache invalidation in a clustered environment.

SUMMARY

Embodiments of the present invention improve the manner in which cache invalidation is managed. In one embodiment the present invention includes a method and system for managing cache invalidation. In one embodiment, connection information to a database is stored in an intermediate cache management module. If changes are made to objects in the database, the objects are invalidated in a local cache. The connection information is accessed and used to connect to the database by an invalidation listener. The invalidation listener may determine the changes so that the changes can be reflected in the cache. Embodiments of the present invention may be implemented across multiple nodes in a clustered environment for updating caches on different nodes in response to changes to data objects performed by other nodes.

In one embodiment, the present invention includes a computer-implemented method comprising establishing, by a first application, a first connection to a database, wherein the first connection is specified by first connection information, storing the first connection information in a first intermediate cache management module, wherein a plurality of data objects are stored in the database and in a first cache management module, performing a specified change on a first data object in the database, invalidating the first data object in the first cache management module, and in accordance therewith, generating one or more messages specifying that said first data object has been invalidated, receiving, by a first invalidation listener module coupled to the first cache management module, at least one of said one or more messages, and retrieving from the database, by the first invalidation listener module, information for performing said specified change on the first data object in the first cache management module, wherein the first invalidation listener retrieves the first connection information stored in the first intermediate cache management module to connect to said database, and wherein the first invalidation listener determines the specified change performed on the first data object in the database and notifies said first cache management module to perform said specified change on the first data object stored in the first cache management module.

In another embodiment, the method further comprises establishing, by a second application, a second connection to the database, wherein the second connection is specified by second connection information, storing the second connection information in a second intermediate cache management module, wherein said plurality of data objects stored in the database are further stored in a second cache management module, receiving, by the second cache management module, at least one of said one or more messages, and in accordance therewith, invalidating the first data object in the second cache management module, receiving, by a second invalidation listener module coupled to the second cache management module, at least one of said one or more messages, and retrieving from the database, by the second invalidation listener module, information for performing said specified change on the first data object in the second cache management module, wherein the second invalidation listener retrieves the second connection information stored in the second intermediate cache management module to establish a connection to said database, and wherein the second invalidation listener determines the specified change performed on the first data object in the database and notifies said second cache management module to perform said specified change on the first data object stored in the second cache management module.

In one embodiment, the first application and the first intermediate cache management module are executing on a first computer node in a clustered environment, and wherein the second application and the second intermediate cache management module are executing on a second computer node in the clustered environment.

In one embodiment, the first intermediate cache management module is coupled between the first application and the first cache management module executing on the first node, and wherein the second intermediate cache management module is coupled between the second application and the second cache management module executing on the second node.

In one embodiment, the first invalidation listener module is coupled to the first cache management module and the second invalidation listener module is coupled to the second cache management module.

In one embodiment, the plurality of data objects have a plurality of different types, and wherein each type of data object is associated with a corresponding different invalidation listener.

In one embodiment, the first application and the first cache management module execute in different contexts, and wherein the second application and the second cache management module execute in different contexts.

In one embodiment, the specified operation is a delete, modify, or create operation.

In one embodiment, the method further comprises receiving a request, wherein the request indicates the specified change on the first data object in the database.

In one embodiment, establishing the first connection and storing the first connection occur during the initialization of the first application.

In one embodiment, the connection to the database is already established during a cache initialization phase and is held active by the cache management module for use by the invalidation listeners. The invalidation listener may access this connection to retrieve data from the database.

The following detailed description and accompanying drawings provide a better understanding of the nature and advantages of the present invention.

DETAILED DESCRIPTION

Described herein are techniques for managing cache invalidation in a clustered environment. The apparatuses, processes, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
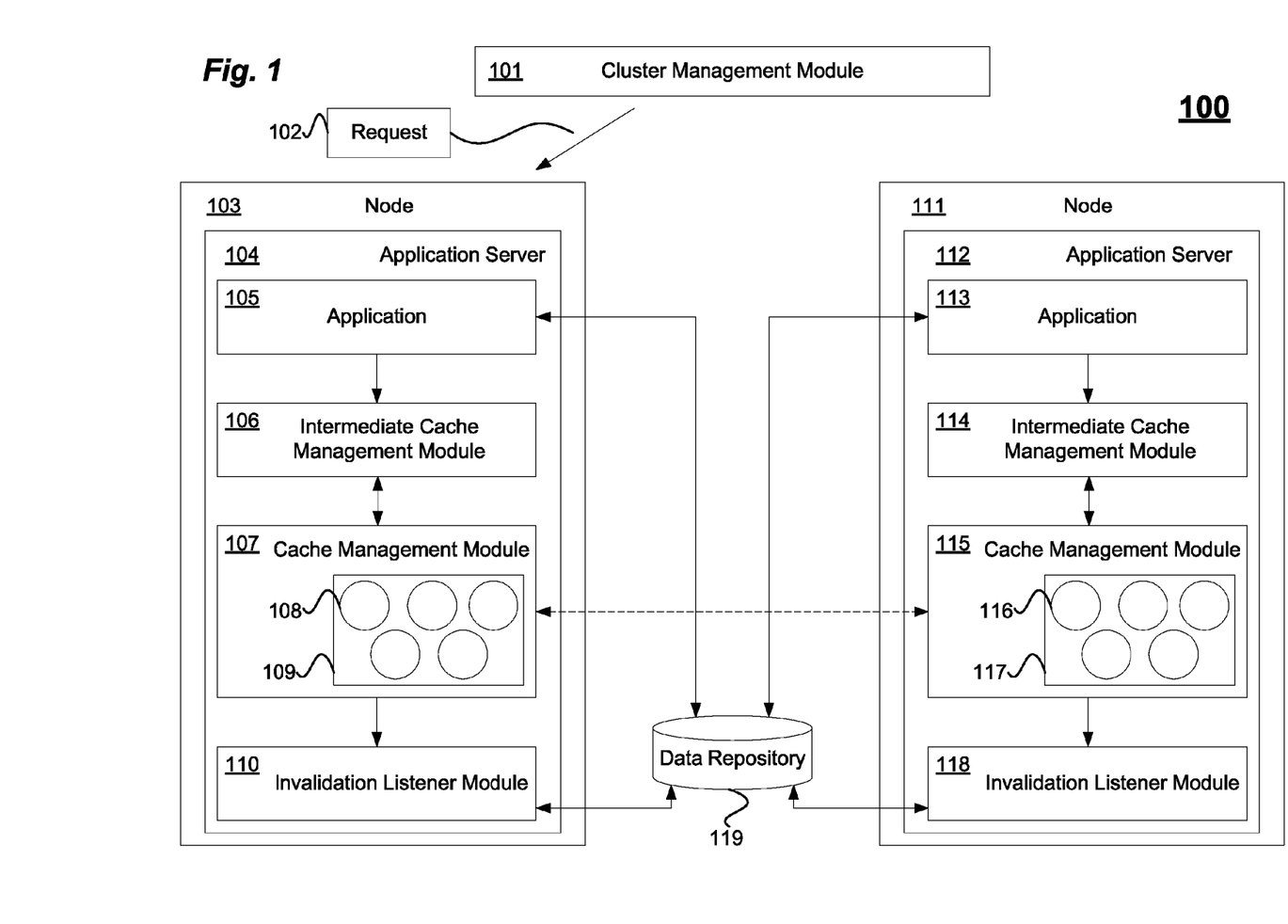
FIG. 1 illustrates an example system for managing cache invalidation in a clustered environment according to one embodiment of the present invention.

FIG. 1 illustrates an example system for managing cache invalidation according to one embodiment of the present invention. In this example, the invention is implemented in a clustered environment. System 100 may include cluster management module 101, node 103, node 111, and data repository 119. Cluster management module 101 may run on a separate computer system (not shown) configured similarly to node 103 and node 111, which are discussed in detail below. In other embodiments, the computer system on which cluster management module 101 may run may be configured in a variety of different ways. Nonetheless, cluster management module 101 may be responsible for distributing the processing of a software application across the nodes in the cluster in an efficient manner. For example, cluster management module 101 may receive a request for a web page (e.g., request 102). Cluster management module 101 may determine to which node to forward the request. The chosen node may then carry out the task of fulfilling the request for the web page.

In one embodiment of the present invention, a node in a cluster may be a separate computer system. For example, node 103 may be one computer system and node 111 may be another separate computer system (e.g., two different servers in a server network). In alternative embodiments, system 100 may include additional nodes similarly configured like nodes 103 and nodes 111. However, for purposes of illustration, FIG. 1 depicts only two nodes, node 103 and node 111. In certain embodiments, node 103 may be configured to include application server 104. Application server 103 may be a software application, for example, which may be SAP® NetWeaver Web Application Server, Oracle® Weblogic Server, IBM® Websphere AS, or Sun® JSAS, that provides services to other software applications. For example, application server 104 may be configured to provide services to application 105.

Data repository 119 may store data, and may comprise one or more databases, for example. Accordingly, data repository 103 may allow application server 101 to retrieve data, store data, create data, delete data, as well as other operations that application server 101 may require in order to perform its tasks.

In one embodiment, application server 104 may include application 105, intermediate cache management module 106, cache management module 107, and invalidation listener module 110. Application 105 may be a software application (e.g., web application) where application server 104 may provide services to application 105, as described above. Further, application 105 may communicate with data repository 119. Application 105 may establish a connection to data repository 119 where application 105 may access data stored therein, for example. Intermediate cache management module 106 may be coupled between application 105 and cache management module 107 and may function as an intermediate layer between application 105 and cache management module 107. Moreover, intermediate cache management module 106 may be configured to store connection information, where connection information may specify a connection to a particular source. Hence, intermediate cache management module 106 may receive from application 105 connection information associated with the connection application 105 established to data repository 119, for example. Note that intermediate cache management module 106 may store additional connection information to other sources (e.g., a different data repository). In addition, intermediate cache management module 106 may service requests for stored connection information. For example, invalidation listener module 110 may, for various reason, attempt to connect to data repository 119. Invalidation listener module 110 may request the connection information from intermediate cache management module 106, which was previously received by application 105. Intermediate cache management module 106 may then send to invalidation listener module 110 the connection information associated with the connection to data repository 119.

In one embodiment, cache management module 107 may be configured to manage data caching. Cache management module 107 may include cache 109 where cache 109 includes one or more cached data objects. In other embodiments of the present invention, cache management module 107 may include additional caches, but for purposes of illustration FIG. 1 shows a single cache (i.e., cache 109). As depicted in FIG. 1, cache data object 108 may be one of the one or more cached data objects included in cache 109. A cached data object may be a duplicate copy of a data object stored in another location where access to the cached data object may be quicker than accessing the data object store in the other location. For example, cached data object 108 may be a duplicate copy of a data object stored in data repository 119 (not shown). It may be quicker for application 105 to retrieve cached data object 108 from cache management module 107 than to retrieve the same data object from data repository 119. Cache management module 107 may be responsible for maintaining the integrity data of cached data objects. Thus, cache management module 107 may handle invalidation of cached data objects. A cached data object may be invalidated when the cached data object is not an accurate duplicate of the corresponding data object. For example, initially the cache and the database, may both have an object named 'A'. At some point of time, the application may change the object name to 'B'. At this time, the database contains the object name as 'B' while the cache still contains the name 'A'. As such, the cache is out of sync with the database. In such situations, the application may call a method (e.g. invalidate) on the cache management module which instructs the cache management module that the object stored in the cache is not in sync with the corresponding object stored in the database (e.g., some or all attributes of the object may be different from the actual). Thus, a cached data object may be invalidated due to changes made to the data object. For example, a cached data object may be a duplicate copy of a data object in data repository 119 (not shown). For various reasons, the data object in data repository 119 may be modified or deleted. Since cache data object 108 is no longer an accurate duplicate copy of the data object, cached data object 108 may be invalidated. Cache management module 107 may receive messages where a message indicates that a particular cached data object is invalidated. For example, cache management module 107 may receive a message from intermediate cache management module 106 where the message indicates that cached data object 108 in cache management module 107 is invalidated. In response to receiving such message, cache management module 107 may communicate with invalidation listener module 110 to refresh the invalidated cached data object as described below. Cache management module 107 may send a similar message indicating that cached data object 108 has been invalidated for invalidation listener module 110, for example. Furthermore, cache management module 107 may receive information associated with a data object in the repository and use the information to update cached data object 108. For example, if information accessed by listener 110 from repository 119 indicates that the data object corresponding to cached data object 108 has been deleted, cache management module 107 may delete cached data object 108. As another example, if the information indicates that the data object in data repository 119 was modified, the information may include the modified and current version of the data object, and cache management module 107 may replace cached data object 108 with the modified and current version of the data object.

In certain embodiments of the present invention, cache management module 107 and cache management module 115 may be configured to communicate with each other through a messaging framework (not shown). For example, a messaging framework may be included in cache management module 107 and cache management module 115, respectively. Accordingly, in embodiments where there may be additional nodes similarly configured like node 103 (i.e., the nodes each include a cache management module similar to cache management module 107), cache management module 107 may be able to communicate with the additional nodes via the messaging framework. Cache management module 107 may send a message to another cache management module where the message indicates that a particular cached data object is invalidated. Likewise, cache management module 107 may receive a message from another cache management module where the message indicates that a particular cached data object is invalidated. In response to receiving such message, cache management module 107 may send a message to invalidation listener module 110 to refresh the invalidated cached data object.

In one embodiment of the present invention, invalidation listener module 110 may be configured to refresh cached data objects in cache management module 107 that have been invalidated. Invalidation module listener 110 may receive a message from cache management module 107 to refresh invalidated cached data object 108, which corresponds to a data object stored in data repository 119, for example. Invalidation listener module 110 may request connection information for establishing a connection to data repository 119 from intermediate cache management module 106, and invalidation listener module 110 may use the connection information to establish a connection to data repository 119 where invalidation listener module 110 may receive information associated with the data object corresponding to cached data object 108. If, for example, the data object in data repository 119 was deleted, invalidation module listener 110 may receive information indicating that the data object corresponding to cached data object 108 has been deleted. Similarly, if the data object in data repository 119 was modified, invalidation module listener 110 may receive the modified and current version of the data object corresponding to cached data object 108. Invalidation listener module 110 may communicate the information to cache management module 107 where cache management module 107 may use the information to update cached data object 108 accordingly.

In another embodiment of the present invention, node 111 may be similarly configured like node 103. That is, node 111 may be configured to include application server 112 where application server 112 may include application 113, intermediate cache management module 114, cache management module 115, and invalidation listener module 118. Additionally, cache management module 115 may include cache 117 that includes one or more cached data objects (e.g., cached data object 116). In certain embodiments, node 103 and node 111 are running the same application server (i.e., application server 104 and application server 112 are separate installations of the same application server software). In another embodiment, application 105 and 113 may be separate instances of the same application running on respective nodes 104 and 111. In certain embodiments of the present invention, cache management module 107 and cache management module 115 may include the same caches, and the cached data objects included in the caches may be the same. For example, cache 109 and cache 117 may be the same and may include the same cached data objects, for example, cached data object 108 and cached data object 116.

Figure 2A:
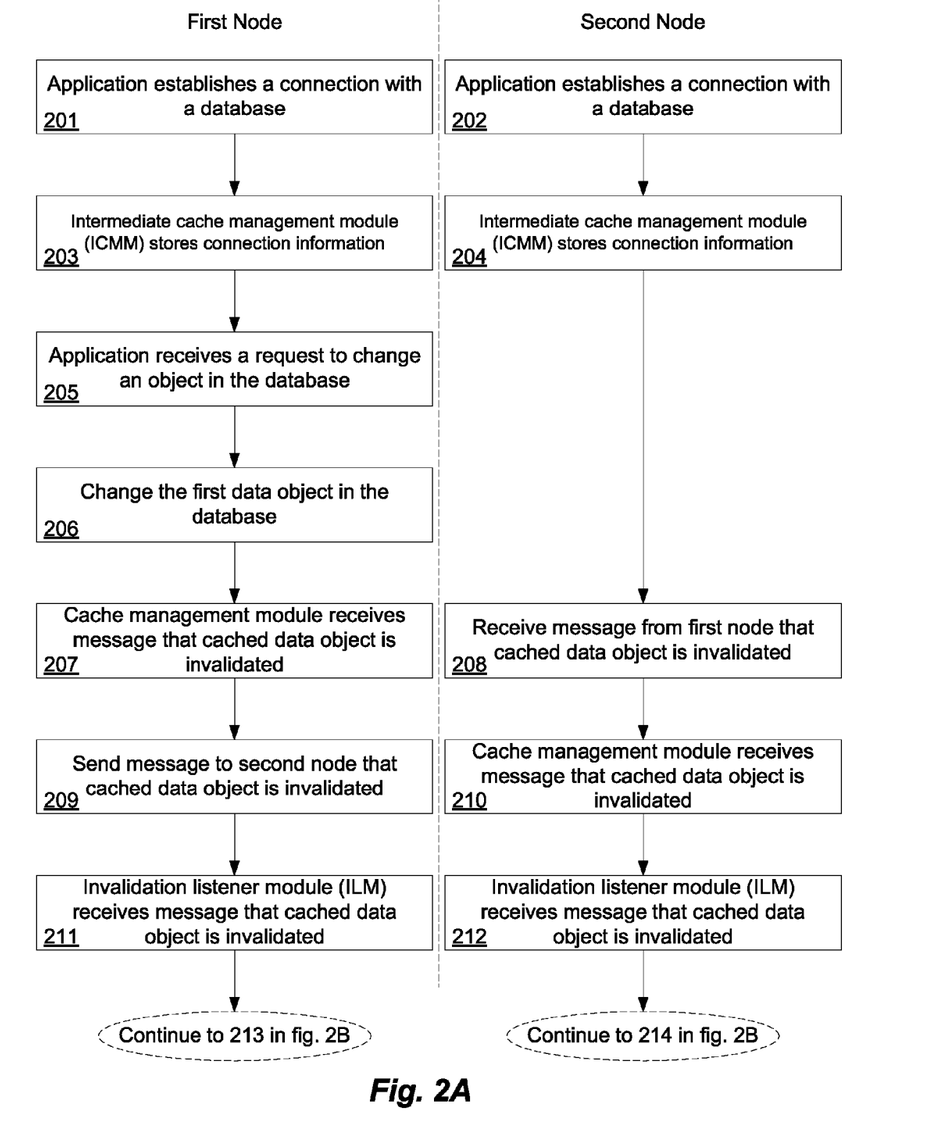
FIG. 2A-B illustrates a method of managing cache invalidation in a clustered environment according to one embodiment of the present invention.
Figure 2B:
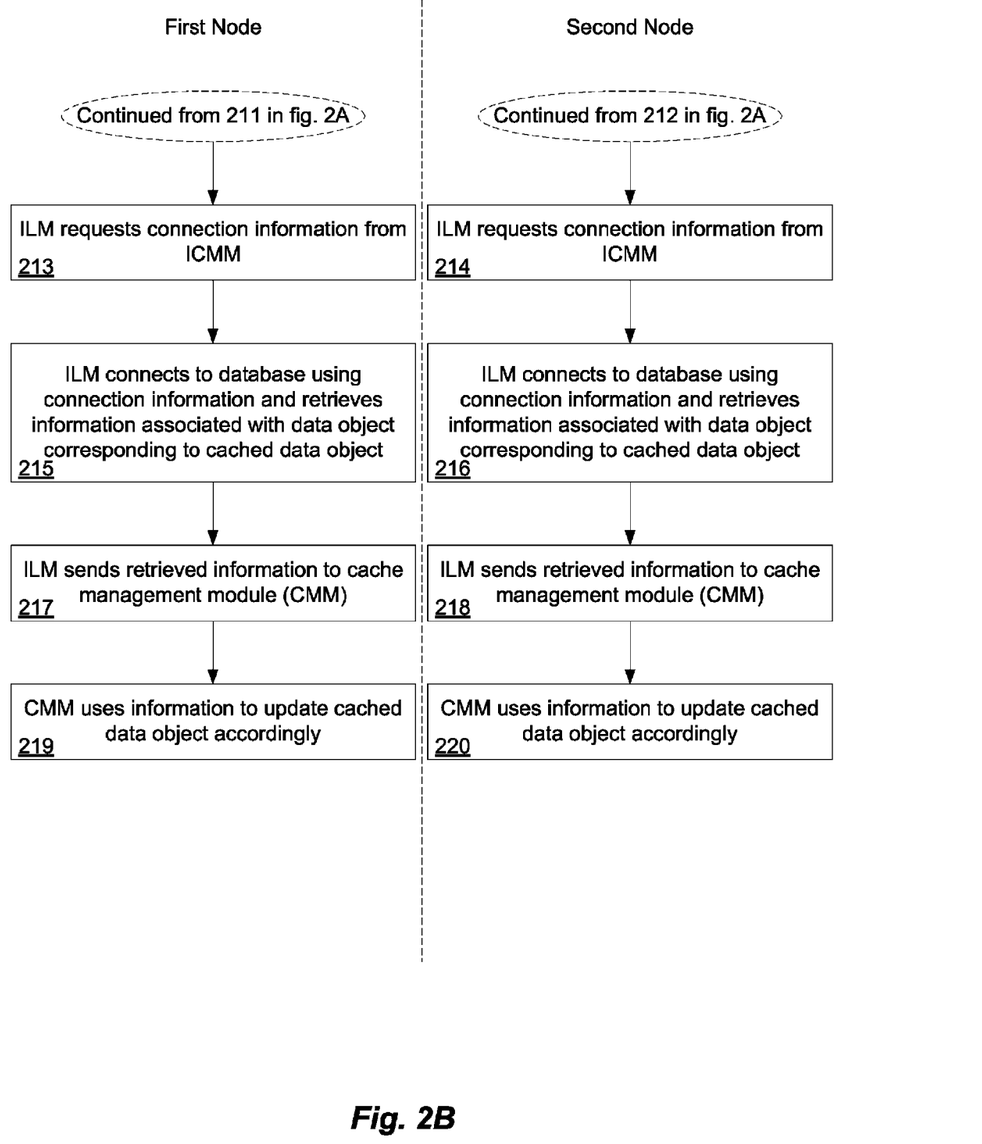

FIG. 2A-B illustrates a method of managing cache invalidation in a clustered environment according to one embodiment of the present invention. In this example, similar steps may be shown side-by-side with one another. However, this does not signify that the steps occur at the same time (although that may be possible). As an example, and for illustrative purposes, First Node (also referred to as the source node) may correspond to node 103 of FIG. 1, and Second Node (also referred to as the non-source node) may correspond to node 111 of FIG. 1. In one embodiment, steps 201-204 may be included as part of the initialization process of application 105 and application 113. At 201, application 105 may establish a connection with a database (e.g., data repository 119). Application 105 may send connection information specifying the established connection to intermediate cache management module 106, where, at 203, intermediate cache management module 106 may store the connection information. The connection information may be, for example, a java object which is instantiated via a JNDI lookup on the application server. This Java object stores a connection to the database. The connection may be identified by various parameters such as database server name, port, user credentials to connect to the database, the database connection driver, etc. . . . Likewise, at 202, application 113 may establish a connection with a database (e.g., data repository 119), and at 204, intermediate cache management module 114 may store connection information specifying the established connection received from application 113. At step 205, application 105 may receive a request (e.g., request 102) where the request indicates a change (e.g., modify or delete) to a data object in data repository 119. Application 105 may then take action to change (e.g., modify or delete) the data object in data repository 119 accordingly at step 206. For example, application 105 may access the repository to make the change. At 207, cache management module 107 may receive a message indicating that a cached data object in cache management module 107 that corresponds to the changed data object in data repository 119 is invalidated (e.g., cached data object 108). At 209, a message from First Node may be sent to the Second Node indicating that a cached data object data object is invalidated. At 208, Second Node may receive this message from First Node. Next, at 210, cache management module 115 may receive a message indicating that a cached data object in cache management module 115 that corresponds to the changed data object in data repository 119 is invalidated (e.g., cached data object 116). At step 211, invalidation listener module 110 may receive a message to refresh the cached data object. In some embodiments, cache management module 107 may send the message to invalidation listener module 110 to refresh the cached data object. Also, cache management module 115 may send a message to invalidation listener module 118 to refresh the cached data object where, at 212, invalidation listener module 118 may receive the message to refresh the cached data object. At 213 in FIG. 2B, invalidation listener module 110 may request connection information from intermediate cache management module 106. In one embodiment, the requested connection information is the connection information intermediate cache management module 106 previously received from application 104 and stored. At 214 in FIG. 2B, invalidation listener module 118 may request connection information from intermediate cache management module 114. In one embodiment, the requested connection information is the connection information intermediate cache management module 114 previously received from application 113 and stored. At step 215, invalidation listener module 110 may establish a connection to data repository 119 using the connection information, and may retrieve information associated with the data object corresponding to cached data object 108. At step 216, invalidation listener module 118 may establish a connection to data repository 119 using the connection information, and may retrieve information associated with the data object corresponding to cached data object 116. At 217, invalidation listener module 110 may send the retrieved information to cache management module 107. Then, at 219, cache management module 107 may use the retrieve information to update the cached data object accordingly. Similarly, at 218, invalidation listener module 118 may send the retrieved information to cache management module 115. At 220, cache management 118 may use the retrieve information to update the cached data object accordingly. For example, if the information indicates that the data object corresponding to cached data objects 108 and 116 has been deleted, cache management modules 107 and 115 may delete cached data object 108 and 116. If the information indicates that the data object in data repository 119 was modified, the information may include the modified and current version of the data object, where cache management module 107 and 115 may replace cached data object 108 and 116 with the modified and current version of the data object.

Figure 3:
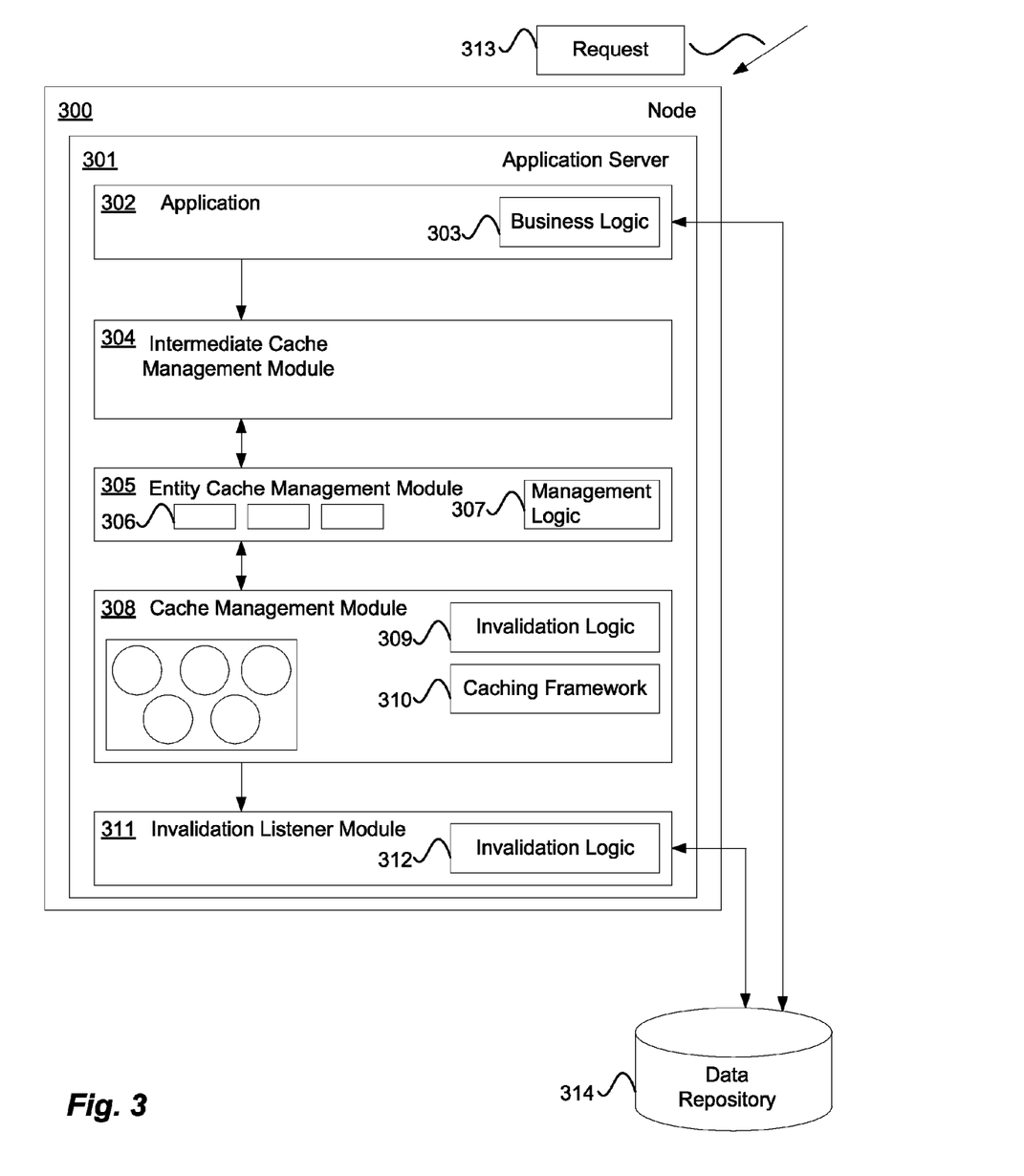
FIG. 3 illustrates an example node in a clustered environment according to one embodiment of the present invention.

FIG. 3 illustrates an example server node in a clustered environment according to one embodiment of the present invention. Node 300 may include application server 301 where application server 301 may be a software system that provides services to other software applications, as described above. In some embodiments of the present invention, node 103 and node 111 of FIG. 1 may be configured like node 301 as described below.

In one embodiment, application server 301 may include application 302, intermediate cache management module 304, entity cache management module 305, cache management module 306, and invalidation listener module 311. Application 302 may receive requests (e.g., request 313) to perform a particular function or task. For example, application 302 may display, modify, create, or delete application data according to the request. Application 302 may include business logic 303 where application 302 may use business logic 303 to perform its interactions with a client. Business logic 303 may be configured to include one or more java classes to implement its functionality. In some embodiments, business logic 303 may be configured to control whether a particular data object in data repository 314 may be cached in an entity cache.

In certain embodiments, intermediate cache management module 303 may be responsible for managing the life of entity caches (e.g., entity cache 306). Intermediate cache management module 303 may include one or more java classes that application 302 may use to manage all the entity caches defined in application 302. In addition, intermediate cache management module 303 may be utilized by other business logic 303 to interact with the entity caches. Intermediate cache management module may receive a database context from application 302. The database context may be a connection to the underlying database (e.g., data repository 314)

where application data may persist. Furthermore, the database context may be a static object that is initialized by application 302 when application 302 starts. The database context may be stored in intermediate cache management module 304 and may be used by invalidation listener module 311 to retrieve data from data repository 314.

In another embodiment of the present invention, entity cache management module 305 may include management logic 307 and entity cache 306 where entity cache 306 may be a caching component responsible for caching objects of a particular entity. For example, an entity may be a type of object (e.g. if "Order-to-cash" is a type of "Business Process" then, "Order-to-cash" is an object of entity "Business Process"). Entity cache is a cache module which stores objects belonging to an entity. Using the example above, "Order-to-Cash" may be an object which is stored within the "Business Process" entity cache. The entity cache leverages to CML to actually cache the data. Entity cache may be a wrapper to CML, for example. In addition, entity cache management module 305 may include one or more entity caches (e.g. entity cache 306), as shown in FIG. 3, where the one or more entity caches may be managed by management logic 307. Therefore, each entity cache in entity cache management module 305 may be responsible for caching objects of its own different entity type. In alternative embodiments, entity cache management module 305 may include additional entity caches, also managed by management logic 307. Application 302 may be configured to use one or more entities. Accordingly, for each entity that application 302 may use, there may be a corresponding entity cache included in entity cache management module 305. Entity cache management module 305 may be configured to leverage the caching component of cache management module 308.

In some embodiments, cache management module 308 may include invalidation logic 309 and caching framework 310. Caching framework 310 may be Java-based and enables caching replication and invalidation over a clustered environment. Caching framework 310 may allow application 302 to register one or more invalidation listener modules (e.g., invalidation listener module 311) where an invalidation listener module may be associated with a particular cache region. For instance, a cache region may form the underlying CML component responsible for managing the objects in cache. The entity cache may register one or more InvalidationListeners with the cache region (e.g., by calling a registerInvalidationListener( ) method). These registered listeners may be invoked by the cache region when a cached object in the region is invalidated. As a specific example,
Entity Cache.registerInvalidationListener(listener)
may call
Cache Region.registerInvalidationListener(listener)
and the application calls
Entity Cach.invalidate( )
which calls
CML Cache Region .invalidate( )
which, in turn, invokes the registered Invalidation Listeners. Moreover, caching framework 310 may notify an invalidation listener module when an object from the cache is invalidated.

In one embodiment, invalidation listener module 311 may include invalidation logic 312. Invalidation listener module 311 may be a component that listens to invalidations of objects of an entity, where invalidation logic 312 may take necessary steps to handle the invalidation. Invalidation listener module 311 may include one or more java classes that may be associated with an entity cache. Further, invalidation listener module 311 may be configured to be compatible with framework 310 that may be provided with cache management module 308. When an object of an entity is invalidated in cache management module 308 (via an entity cache), cache management module 308 notifies invalidation listener module 311 by invoking appropriate methods of invalidation listener module 311. Invalidation listener module 311 may respond to the invocation by having invalidation logic 312 take the necessary steps to handle the invalidation.

Figure 4:
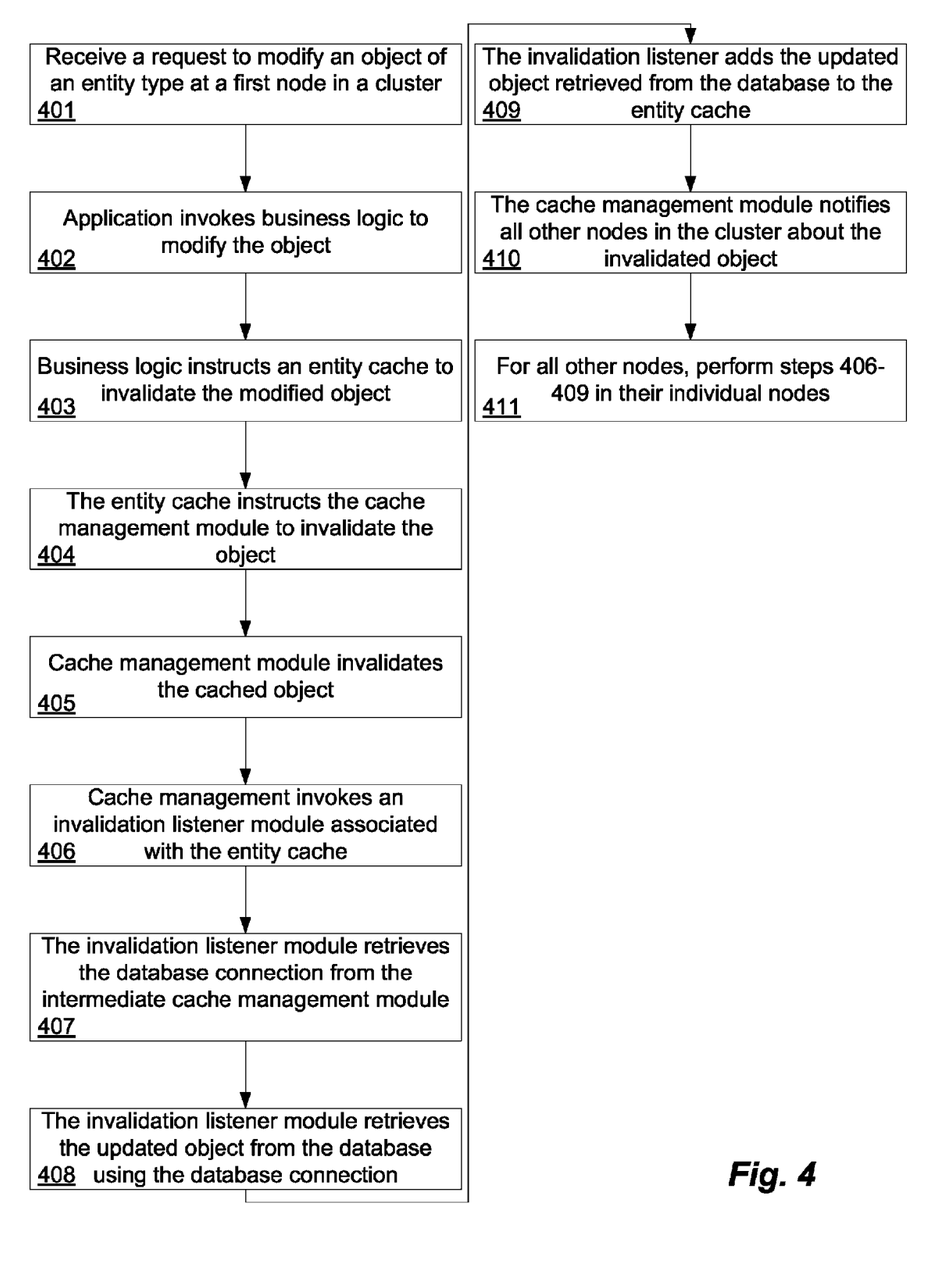
FIG. 4 illustrates a method of managing cache invalidation in a clustered environment according to one embodiment of the present invention.

FIG. 4 illustrates a method of managing cache invalidation in a clustered environment according to one embodiment of the present invention. As an example, and for purposes of illustration, the method of FIG. 4 may be applied to FIG. 3. Before step 401, a cluster management module may distribute the processing of a software application across the nodes in the cluster, as described above. For example, an application may receive a hypertext transfer protocol (HTTP) request from a client, and the application may interpret the request as a request to modify an object in the data repository 314. The cluster management module may forward the request (e.g., request 313) to a node in cluster. Application 302 may establish a connection to data repository 314 during application 302's initialization process where the connection may be stored in intermediate cache management module 304. At 401, request 313 may request to modify an object of an entity type may be received at a first node (e.g., node 300) in a clustered environment. Node 300 may be referred to as the source node or the primary node since the invalidation is initiated from this node. At 402, application 302, which may be an instance of the application running on the node 300, invokes business logic 303 to modify the object. Application 302 may invoke a method in a java class to modify the object in the data repository 314. Business logic may update the data in data repository 314. Further, business logic 303 may get a handle to an entity cache (e.g., entity cache 306) from intermediate cache management module 304 by calling a method in intermediate cache management module 304 and passing a variable indicating the entity type. At step 403, business logic 303 may instruct the retrieved entity cache to invalidate the modified object by passing a unique identifier associated with the invalidated object to the invalidation method of the retrieved entity cache. At 404, the retrieved entity cache may instruct cache management module 308 to invalidate the object from memory by passing the unique identifier associated with the invalidated object to the invalidation method of cache management module 308. Next, at 405, cache management module 308 may invalidate the cached object via invalidation logic 309. At step 406, cache management module may invoke invalidation listener module 311, which may be associated with the entity cache, using invalidation logic 309. Invalidation listener module 311 may have previously been registered with cache management module 308 for this particular entity cache during the initialization of the cache at the time application 302 was started. Cache management module 308 may, via invalidation logic 309, invoke invalidation listener module 311 by calling an invalidate method of invalidation listener module 311 and passing the unique identifier associated with the invalidated object. At 407, invalidation listener module 311 may obtain the connection to data repository 314 from intermediate cache management module 304. Next, at step 408, invalidation listener module 311 may, use the connection to obtain the updated object from data repository 314 by querying against the unique identifier that was passed invalidation listener module 313. At 409, invalidation listener module 311 may add the object retrieved from data repository 314 to the entity cache by calling an "add" method of the entity cache and passing the unique identifier associated with the updated object and the updated object itself. In certain embodiments, steps 407-409 may be performed by invalidation logic 312. Next, at 410, cache management module 308 may notify the invalidation listener modules in the secondary cluster nodes (i.e., non-source nodes) that the data object was invalidated, and pass to the secondary cluster nodes the unique identifier associated with the invalidated object. Finally, at step 411, steps 406-409 may be repeated for each secondary node in order to refresh the cache on their individual nodes.

Figure 5:
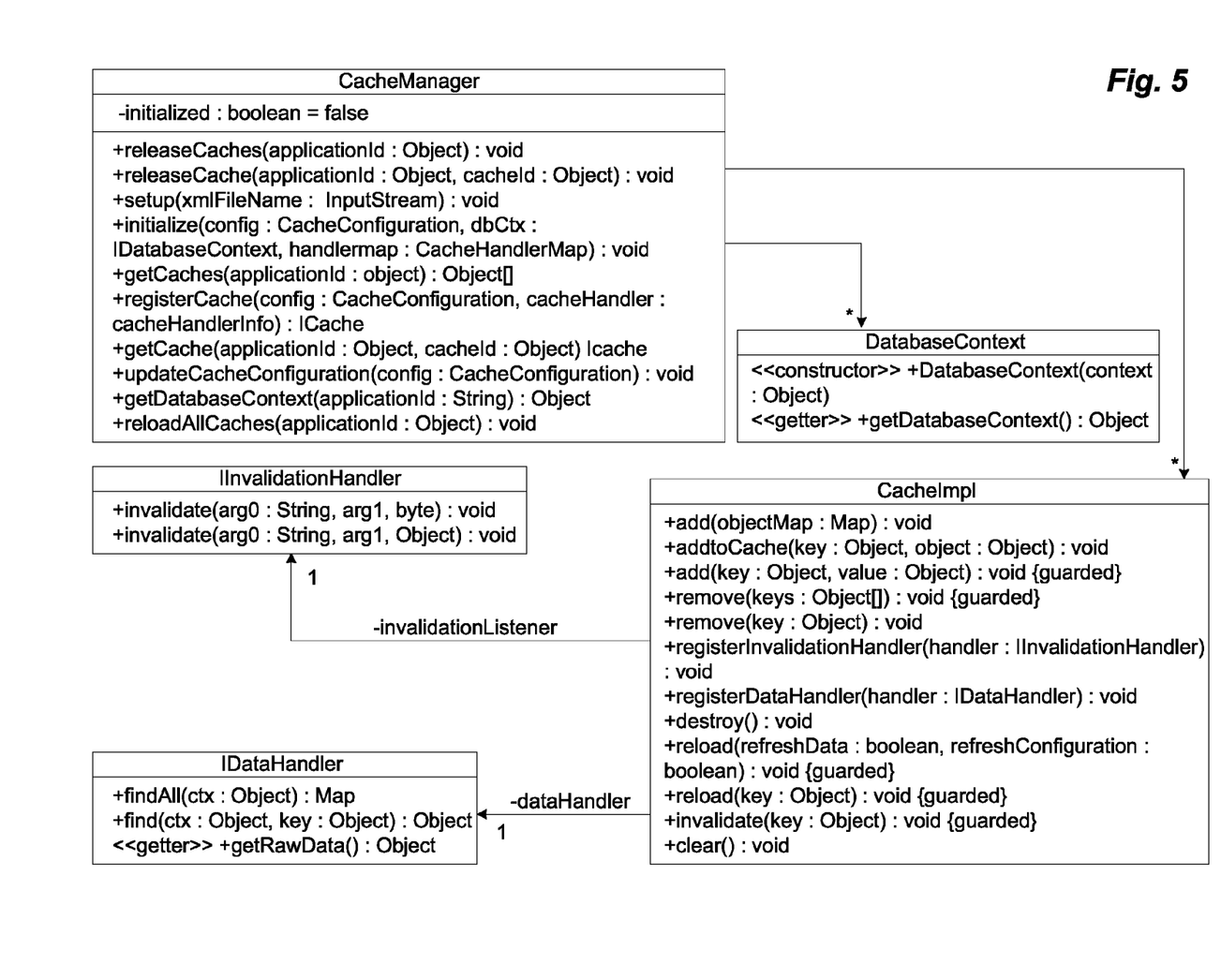
FIG. 5 illustrates an example implementation class diagram according to one embodiment of the present invention.

FIG. 5 illustrates an example implementation class diagram according to one embodiment of the present invention. The example implementation class diagram may be used to implement the functionality of the various components illustrated in FIG. 3. The classes in this specific example work as follows:

I. Cache Manager—The main interface of the Caching Framework used by applications to interact with the cache.

ReleaseCaches—This removes all cached objects in all Entity Caches and clears all memory used by the cached objects ReleaseCache—Removes all cached objects in one Entity Cache and clears the associated memory Setup—It creates the metadata entries in the database required to use the Caching Framework. This is the first method that needs to be invoked before using the Caching Framework. This method sets up configuration information about the Cache Framework and is used exclusively by the framework for its operations.

Initialize—This method initializes the various entity caches, stores the application's database connection and assigns the various InvalidationHandlers to the appropriate entity caches. This initializes the cache framework and makes it ready for use via the CacheManager.

GetCaches—Returns all the Entity Caches for a specified Application

RegisterCache—Registers an Entity Cache to a specified Application

GetCache—Return a specified Entity Cache for an Application

UpdateCache—Update the configuration setting of a given Entity Cache. This updates the metadata stored for the Entity Cache in the Framework's database GetDatabaseContext—Returns the database connection stored for the specified Application. It is typically used by the various InvalidationListeners registered in the various Entity Caches for the specified Application.

ReloadAllCaches—Reloads the data in all registered EntityCaches for the given application.

II. Database Context—The framework wrapper class that wraps an actual database connection getDatabaseContext—Returns the actual JDBC (Java DataBase Connection) object which represents a database connection.

III. Invalidation Handler—The CML class that handles all invalidation events

Invalidate (String, byte)—process an invalidation event. The first parameter is the ID of the invalidated object and the second parameter is the type of invalidation (delete, update)

Invalidate (String, Object)—process an invalidation event. The first parameter is the ID of the invalidated object and the second parameter is the invalidated object IV. CacheImpl—A wrapper to a CML Cache Region which acts as a bridge between the client and CML.

Add—Adds all the objects in the specified map to the Entity Cache

AddtoCache—Adds the specified object to the Entity Cache

Add (key, object)—Same as addToCache

Remove (keys)—Removes the objects mapped to the specified keys, from the cache

Remove (key)—Removes the object mapped to the specified key, from the cache

RegisterInvalidationHandler—Registers an invalidationHandler with the Entity Cache. This in turn internally registers the specified InvalidationHandler with the CML Cache Region. InvalidationHandler is the InvalidationListener explained in the rest of the document which is responsible for handling the invalidation messages sent to it by the CML framework.

RegisterDataHandler—An object which implements methods that are used by the EntityCache to read data from the database Destroy—Removes all objects stored in the specified Entity Cache Reload (refreshdata, refreshconfiguration)—Reloads and Entity Cache. If refreshData is true then it reloads the data from database other wise it reuses existing cached data. If refreshConfiguration is true then it refreshes the EntityCache configuration with that stored in the Cache metadata tables.

Invalidate—Invalidate an object in the EntityCache. This triggers the invalidation in the CML Cache Region which trickles to the InvalidationListener Clear—This removes the objects in the Entity Cache V. IDataHandler—An interface that is implemented by each Entity that is cached. e.g.

Business Process DataHandler will implement this interface to fetch all Business Processes from the application's database Find—Retrieves the data associated with specified key using the specified database connection. This would typically be used by the InvalidationHandler to retrieve the updated information of the invalidated object FindAll—Retrieves all objects of the associated Entity from the database using the database connection.

Figure 6:
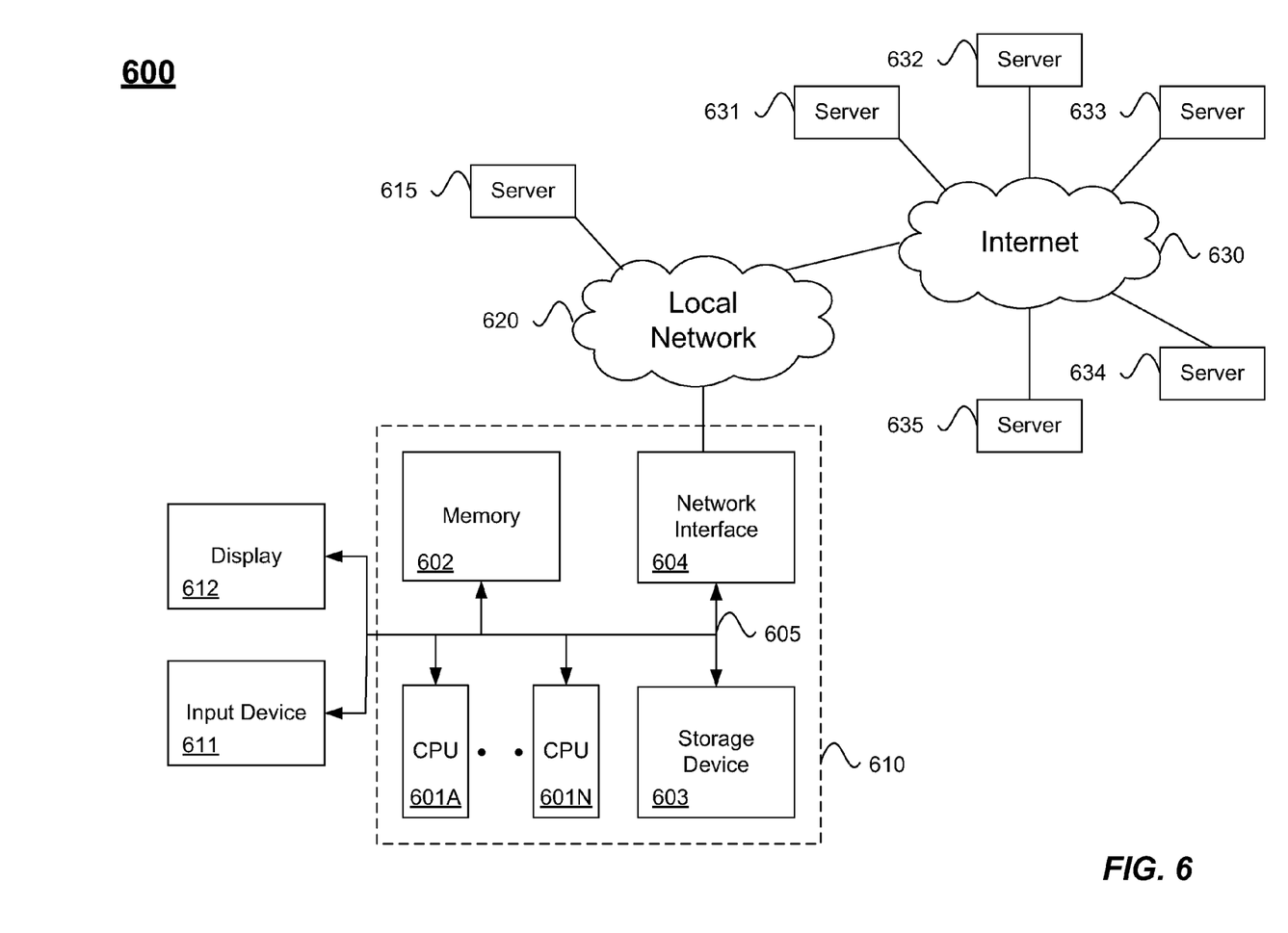
FIG. 6 illustrates a simplified diagram of a hardware system for implementing processes according to one embodiment of the present invention.

FIG. 6 illustrates a simplified diagram of a hardware system for implementing processes according to one embodiment of the present invention. Computer system 610 includes one or more buses 605 or other communication mechanism for communicating information, and one or more central processing units ("CPUs" or "processors") 601A-N coupled with bus 605 for processing information. It is to be understood that actual implementations may vary and include additional multi-CPU components for managing multiple CPUs. Computer system 610 also includes one or more memories 602 coupled to bus 605 for storing information and instructions to be executed by processors 601, including information and instructions for performing the techniques described above, for example. This memory may also be used for storing variables or other intermediate information during execution of instructions to be executed by processors 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques or embodying the constructs above, for example.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. Different processes may be implemented on any computer system and send and/or receive information across a network, for example. In one embodiment, the techniques describe above may be implemented by software services on one or more servers 631-635, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   establishing, by a first application, a first connection to a database, wherein the first connection is specified by first connection information;
   storing the first connection information in a first intermediate cache management module, wherein a plurality of data objects are stored in the database and in a first cache management module;
   performing a specified change on a first data object in the database;
   invalidating the first data object in the first cache management module, and in accordance therewith, generating one or more messages specifying that said first data object has been invalidated;
   receiving, by a first invalidation listener module coupled to the first cache management module, at least one of said one or more messages; and
   retrieving from the database, by the first invalidation listener module, information for performing said specified change on the first data object in the first cache management module,
   wherein the first invalidation listener retrieves the first connection information stored in the first intermediate cache management module to connect to said database, and wherein the first invalidation listener determines the specified change performed on the first data object in the database and notifies said first cache management module to perform said specified change on the first data object stored in the first cache management module.

2. The method of claim 1 further comprising:
   establishing, by a second application, a second connection to the database, wherein the second connection is specified by second connection information;
   storing the second connection information in a second intermediate cache management module, wherein said plurality of data objects stored in the database are further stored in a second cache management module;
   receiving, by the second cache management module, at least one of said one or more messages, and in accordance therewith, invalidating the first data object in the second cache management module;
   receiving, by a second invalidation listener module coupled to the second cache management module, at least one of said one or more messages; and
   retrieving from the database, by the second invalidation listener module, information for performing said specified change on the first data object in the second cache management module,
   wherein the second invalidation listener retrieves the second connection information stored in the second intermediate cache management module to establish a connection to said database, and wherein the second invalidation listener determines the specified change performed on the first data object in the database and notifies said second cache management module to perform said specified change on the first data object stored in the second cache management module.

3. The method of claim 2 wherein the first application and the first intermediate cache management module are executing on a first computer node in a clustered environment, and wherein the second application and the second intermediate cache management module are executing on a second computer node in the clustered environment.

4. The method of claim 3 wherein the first intermediate cache management module is coupled between the first application and the first cache management module executing on the first node, and wherein the second intermediate cache management module is coupled between the second application and the second cache management module executing on the second node.

5. The method of claim 2 wherein the first invalidation listener module is coupled to the first cache management module and the second invalidation listener module is coupled to the second cache management module.

6. The method of claim 1 wherein the plurality of data objects have a plurality of different types, and wherein each type of data object is associated with a corresponding different invalidation listener.

7. The method of claim 1 wherein the first application and the first cache management module execute in different contexts, and wherein the second application and the second cache management module execute in different contexts.

8. The method of claim 1 wherein the specified operation is a delete, modify, or create operation.

9. The method of claim 1 further comprising receiving a request, wherein the request indicates the specified change on the first data object in the database.

10. The method of claim 1 wherein establishing the first connection and storing the first connection occur during the initialization of the first application.

11. A non-transitory computer-readable storage medium embodying a computer program for performing a method, said method comprising:

establishing, by a first application, a first connection to a database, wherein the first connection is specified by first connection information;

storing the first connection information in a first intermediate cache management module, wherein a plurality of data objects are stored in the database and in a first cache management module;

performing a specified change on a first data object in the database;

invalidating the first data object in the first cache management module, and in accordance therewith, generating one or more messages specifying that said first data object has been invalidated;

receiving, by a first invalidation listener module coupled to the first cache management module, at least one of said one or more messages; and retrieving from the database, by the first invalidation listener module, information for performing said specified change on the first data object in the first cache management module, wherein the first invalidation listener retrieves the first connection information stored in the first intermediate cache management module to connect to said database, and wherein the first invalidation listener determines the specified change performed on the first data object in the database and notifies said first cache management module to perform said specified change on the first data object stored in the first cache management module.

12. The method of claim 11 further comprising:

establishing, by a second application, a second connection to the database, wherein the second connection is specified by second connection information;

storing the second connection information in a second intermediate cache management module, wherein said plurality of data objects stored in the database are further stored in a second cache management module;

receiving, by the second cache management module, at least one of said one or more messages, and in accordance therewith, invalidating the first data object in the second cache management module;

receiving, by a second invalidation listener module coupled to the second cache management module, at least one of said one or more messages; and retrieving from the database, by the second invalidation listener module, information for performing said specified change on the first data object in the second cache management module, wherein the second invalidation listener retrieves the second connection information stored in the second intermediate cache management module to establish a connection to said database, and wherein the second invalidation listener determines the specified change performed on the first data object in the database and notifies said second cache management module to perform said specified change on the first data object stored in the second cache management module.

13. The method of claim 12 wherein the first application and the first intermediate cache management module are executing on a first computer node in a clustered environment, and wherein the second application and the second intermediate cache management module are executing on a second computer node in the clustered environment.

14. The method of claim 13 wherein the first intermediate cache management module is coupled between the first application and the first cache management module executing on the first node, and wherein the second intermediate cache management module is coupled between the second application and the second cache management module executing on the second node.

15. The method of claim 12 wherein the first invalidation listener module is coupled to the first cache management module and the second invalidation listener module is coupled to the second cache management module.

16. The method of claim 11 wherein the plurality of data objects have a plurality of different types, and wherein each type of data object is associated with a corresponding different invalidation listener.

17. The method of claim 11 wherein the first application and the first cache management module execute in different contexts, and wherein the second application and the second cache management module execute in different contexts.

18. The method of claim 11 wherein the specified operation is a delete, modify, or create operation.

19. The method of claim 11 further comprising receiving a request, wherein the request indicates the specified change on the first data object in the database.

20. The method of claim 11 wherein establishing the first connection and storing the first connection occur during the initialization of the first application.

* * * * *